May 23, 1933.                B. CAROSELLI                1,910,883
                               DOORCHECK
                          Filed Oct. 31, 1931           2 Sheets-Sheet 1
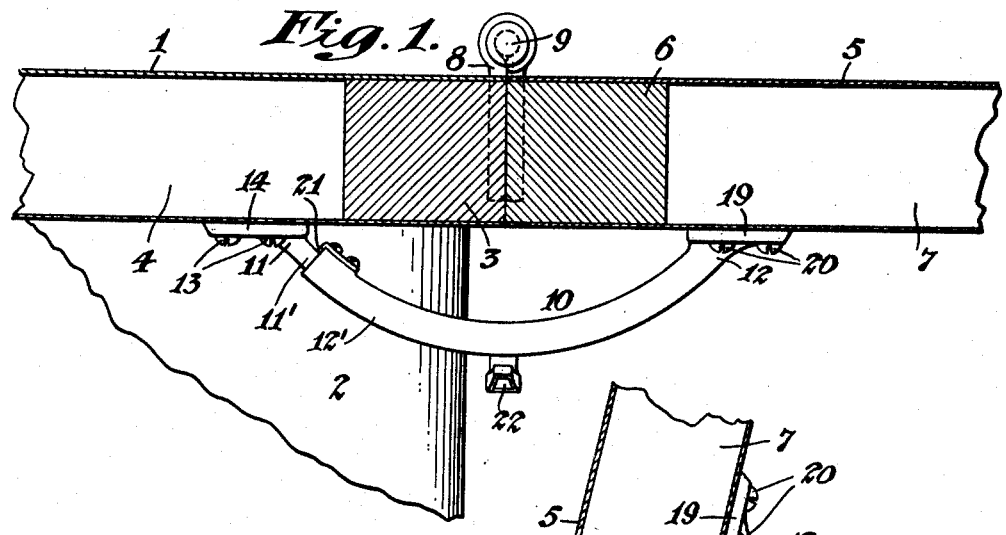
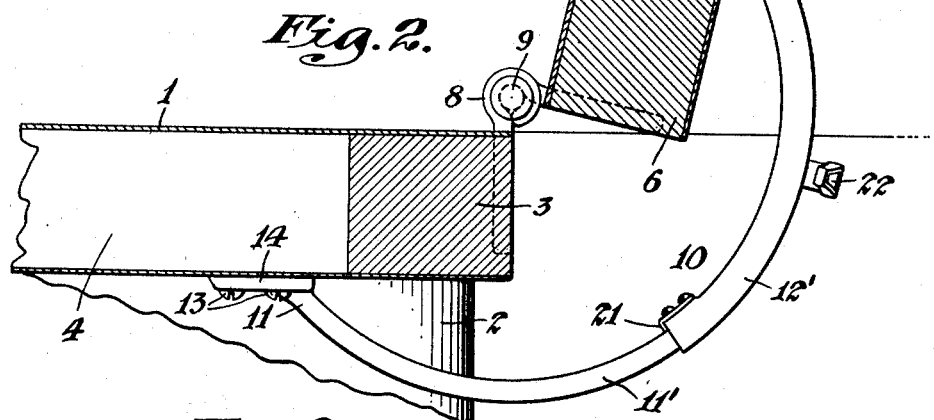
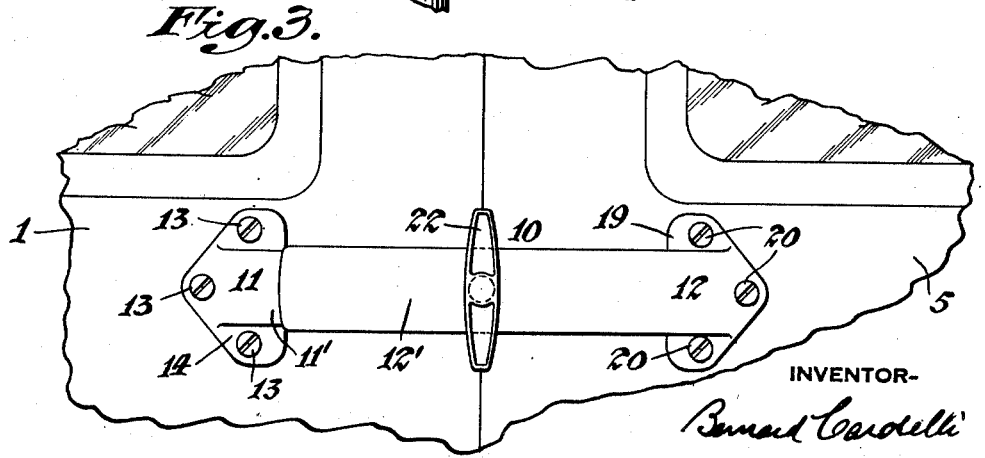
INVENTOR-
Bernard Caroselli

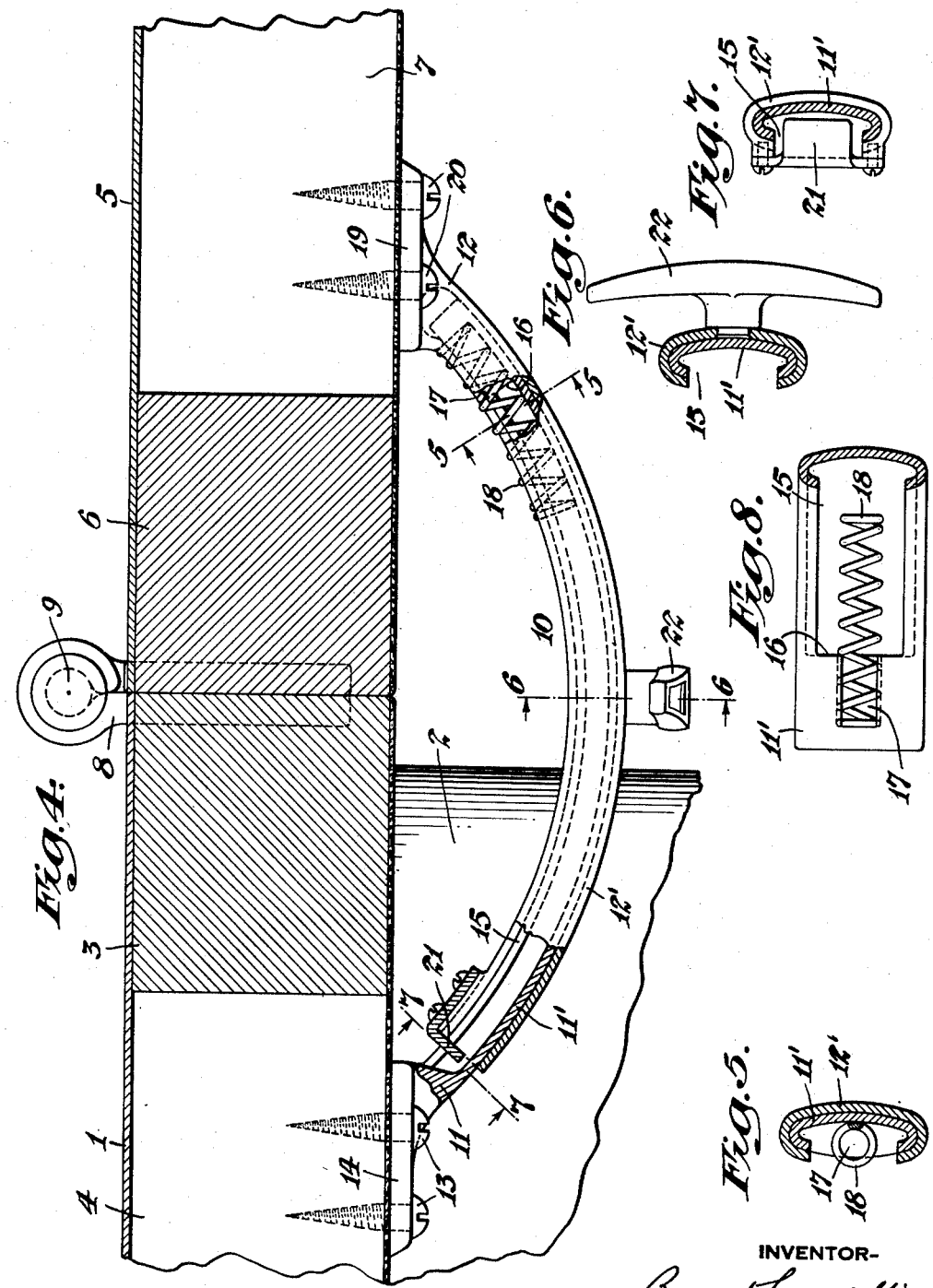

Patented May 23, 1933

1,910,883

UNITED STATES PATENT OFFICE

BERNARD CAROSELLI, OF NEW YORK, N. Y.

DOORCHECK

Application filed October 31, 1931. Serial No. 572,236.

My invention relates to door checks and more particularly to those for use on automobile doors, and an object of my invention is to provide a door check that will not only effectively prevent the doors of such vehicles from opening beyond sufficient limitations to thereby avoid undue strains upon the hinges as well as possible injury to the adjacent body walls which might otherwise be mutilated or marred by coming into contact with the door should it be swung too far open, but which will also function to close the door again through the provision of a handle or its equivalent forming a part of said door check.

This handle carried by my improved door check provides a control for closing the door that is within convenient reach of a person who may have entered the automobile and seated himself. In taxi-cabs for example, people frequently enter and seat themselves and then discover that it is necessary to awkwardly reach out to close the door which is beyond the control of the driver. During stormy weather they are further inconvenienced by exposure to the elements.

Modern door checks in such vehicles are usually mounted on the top of the doors, are comparatively complicated and expensive and are not adaptable to close the door. My door check is simple and compact, pleasing in appearance, positive in operation, and in addition can be utilized to conveniently close the door without rising from a seated position or excessive reaching.

It is easily applied as a unit, and projects a minimum distance into the interior of the vehicle. Further objects of the invention are hereinafter set forth.

I attain these objects as fully set forth in detail in the following specification and drawings forming a part thereof in which latter I have illustrated a preferred embodiment of my invention.

Referring to such drawings,

Fig. 1 is a horizontal fragmentary section showing a portion of the left side of the body of an automobile and the adjacent rear door, with a door check mounted thereon embodying my invention.

Fig. 2 is a similar view but with the parts in the position they will occupy when the door is open.

Fig. 3 is an inside elevation of the parts shown in Fig. 1.

Fig. 4 is an enlarged view similar to Fig. 1 but with parts broken away to illustrate further details.

Fig. 5 is a vertical section through the door check as indicated on the line 5—5 of Fig. 4.

Fig. 6 is a similar section on the line 6—6 of Fig. 4.

Fig. 7 is a section on the line 7—7 of Fig. 4, and

Fig. 8 is a side elevation of the outer end of one of the members of the door check.

A portion of the left side wall 1 of the body of an automobile is shown in Fig. 1 adjacent the rear seat 2, having the usual forward rear-quarter pillar 3 and rear-quarter belt rail 4. A portion of the left rear door 5 is shown together with the rear pillar 6 thereof and door belt rail 7. A hinge 8 is secured to pillars 3 and 6 in accordance with standard practice projecting outwardly so that the door 5 can swing open around the pivot 9 of the hinge.

My improved door check is indicated generally at 10 and consists of a male member 11 and a female member 12. Member 11 is secured to the body belt rail 4 by screws 13 passing through a base 14 and into the said rail, commonly made of wood. Member 11 has an arcuate shank 11' extending forwardly away from the base 14, and when positioned horizontally on rail 4 said shank 11' may be substantially concentric with respect to an arc radiating from the pivot 9 of hinge 8. Shank 11' throughout the major portion of its curvature is C shaped in cross section, as shown in Fig. 6, to provide a slot 15 terminating near the outer end of said member to form a shoulder 16. Beyond this shoulder there is provided a pocket 17 within which is seated a spring 18.

Member 12 is also preferably arcuate, such curvature corresponding to that of member 11 which it is adapted to surround in overlapping relation. Member 12 has a base 19 from which its shank 12' extends in a manner similar to member 11 and screws 20 secure base 19 to wooden rail 7 of the door 5. A lug 21 is secured to or forms a part of member 12 at the outer end thereof, and projects inwardly within the slot 15 of member 11. Member 12 has a handle 22 secured thereto at some convenient point, or its equivalent such as a projecting hook may be substituted, or the piece itself may even be of such suitable configuration as to provide a hand hold to permit it to be manually moved in order to draw the door closed from the position shown in Fig. 2.

When the door is opened it will carry with it the member 12 to which it is attached. The latter will then slide along the fixed member 11 the lug 21 presently coming into contact with the outer end of the spring 18 which upon further movement of the door in the same direction will compress to thereby check the momentum of the door prior to the positive engagement of the lug 18 with the shoulder 16, such position corresponding to the extreme open position of the door.

The handle 22 is now in its outermost position as shown in Fig. 2, but still within easy reach of a person who may have entered and occupied seat 2. The door may now be conveniently closed by simply grasping the handle and pulling the member 12 in an opposite direction, the inertia of the door being partially overcome by the urge of the spring 18 at the time of such initial door-closing movement.

It is not essential that member 12 be restrained from moving other than concentrically with respect to member 11. A part of the surrounding wall of member 12 could be cut away to permit a relatively eccentric movement to take place during the opening of the door if desired. It is to be understood that I do not wish to limit my invention to a door check having an operating radius concentric to the hinge center of the door as it is believed that the provision of sufficient play between the contiguous walls of members 11 and 12 would compensate for any comparatively slight eccentricity that would be present should a standard dimensioned door check be applied to cars in which the distance between the hinge pivot and the inner surface of the adjacent wall varied within reasonable limits now existing. Under such conditions the operating radius would not center precisely in the door hinge, but the aforesaid clearance would allow the member 12 to move out of its parallel relation to member 11.

It is obvious that various modifications of the embodiment herein illustrated may be employed to secure substantially the same results without departing from the spirit of the invention and therefore I do not wish to be limited to the exact form and construction shown as such modifications will readily suggest themselves to those skilled in the art.

I claim:

1. A door check for vehicles comprising arcuate members slidably connected together to thereby provide an extensible link operable about the hinge center of said door, one of said members having a projection thereon to permit said member to be manually moved with respect to the other member, and means adapted to limit the relative movement of said members in an extended direction including a resilient element to cushion such limitation.

2. In a vehicle, a door check comprising arcuate members slidably connected together, one of said members being secured to the body of said vehicle and the other to the door thereof to provide an extensible link adapted to expand in a circular plane about the hinge center of said door when the latter is opened, and means for limiting such relative movement of said members including resilient means to cushion such limitation.

3. A door check for vehicles comprising arcuate members slidably associated to thereby provide an extensible link operable about the hinge center of said door, one of said members being attached at one end to the door of said vehicle, and the other at its relatively opposite end to the body of said vehicle, and cushioning means adapted to check the relative movement of said members when said door is opened.

4. A door check for vehicles comprising an arcuate male member, and an arcuate female member, said members being arranged in overlapping relation, and relatively slidable with respect to one another about the hinge center of said door, each of said members at its respectively opposite end being provided with a base plate for attachment of the one member to the body of said vehicle, and the other to the door thereof, a resilient element carried by one of said members adjacent the end of same opposite its base plate end, and means adjacent a similar end of the other of said members and forming a part thereof adapted to oppose said resilient element and thereby check said door when the latter is opened.

5. A door check for vehicles comprising an arcuate male member having a slot in the wall forming the inner curvature thereof, a base plate at one end of said member for attaching same to the body of said vehicle, a resilient element seated in a pocket in the other end of said member, an arcuate female member, a base plate at one end of said member for attaching same to the door of said vehicle, said arcuate members being arranged in overlapping relation and being relatively slidable with respect to one another about the hinge center of said door, and a projection located adjacent the other end of said female member extending through the slot of said male member and adapted to contact with said resilient element when said door is opened to thereby check the latter.

6. A door check for vehicles comprising two members horizontally disposed in an arc radiating substantially from the hinge center of said door and in overlapping relation to one another, each of said members being attached to said vehicle at its relatively opposite end, one member to the body and the other one to the door thereof, a resilient element carried by one of said members, and a part of the other member being adapted to engage said resilient element when said door is opened to thereby check same, and means carried by the member attached to said door adapted to afford a hand hold by which it may be manually retracted to thereby close said door.

BERNARD CAROSELLI.